United States Patent [19]

Büchler

[11] Patent Number: 4,880,220
[45] Date of Patent: Nov. 14, 1989

[54] DEVICE FOR HOLDING AN OBJECT IN A SPATIAL POSITION

[75] Inventor: René Büchler, Sonnental, Switzerland

[73] Assignee: Buchler B-SET AG., Flawil, Switzerland

[21] Appl. No.: 942,012

[22] Filed: Dec. 12, 1986

Related U.S. Application Data

[63] Continuation of Ser. No. 709,259, Mar. 7, 1985, abandoned.

[30] Foreign Application Priority Data

Mar. 9, 1984 [CH] Switzerland ............ 1185/84

[51] Int. Cl.$^4$ .................................. B23Q 1/04
[52] U.S. Cl. ........................ 269/71; 269/73; 269/289 R; 269/900; 269/309; 269/303
[58] Field of Search ............ 33/572; 269/71, 73, 269/289 R, 900, 256, 257, 303, 304, 309; 108/4, 243

[56] References Cited

U.S. PATENT DOCUMENTS

| | | | |
|---|---|---|---|
| 2,345,708 | 4/1944 | Lines | 269/73 |
| 2,351,773 | 6/1944 | Lovenston | 269/71 X |
| 2,353,891 | 7/1944 | Gruntorad | 269/71 |
| 3,069,154 | 12/1962 | Zwick | 269/73 |
| 3,499,642 | 3/1970 | Porter | 269/71 |
| 4,341,020 | 7/1982 | Bailey | 269/900 X |
| 4,489,928 | 12/1984 | Dietrich | 269/251 |
| 4,525,930 | 7/1985 | Bury | 33/572 |

FOREIGN PATENT DOCUMENTS 945576 11/1948 France .................. 269/71

*Primary Examiner*—Judy Hartman
*Attorney, Agent, or Firm*—Wegner & Bretschneider

[57] ABSTRACT

A device for holding an object in a spatial position containing a pallet-presetting structure on which a pallet is located. This pallet is held on the presetting structure. The presetting structure contains a base plate, a second plate setting on top of the latter, and a third plate. The second plate is connected both to the base plate and to the upper plate by hinges. The respective hinge pair each has an axis which is at right angles to the other. In this way, the plates can be swung open to define a right angle to one another. A vertical measuring column is also provided. By this device, a point of an object can be exactly measured or set in a horizontal position by the vertical measuring column.

8 Claims, 10 Drawing Sheets

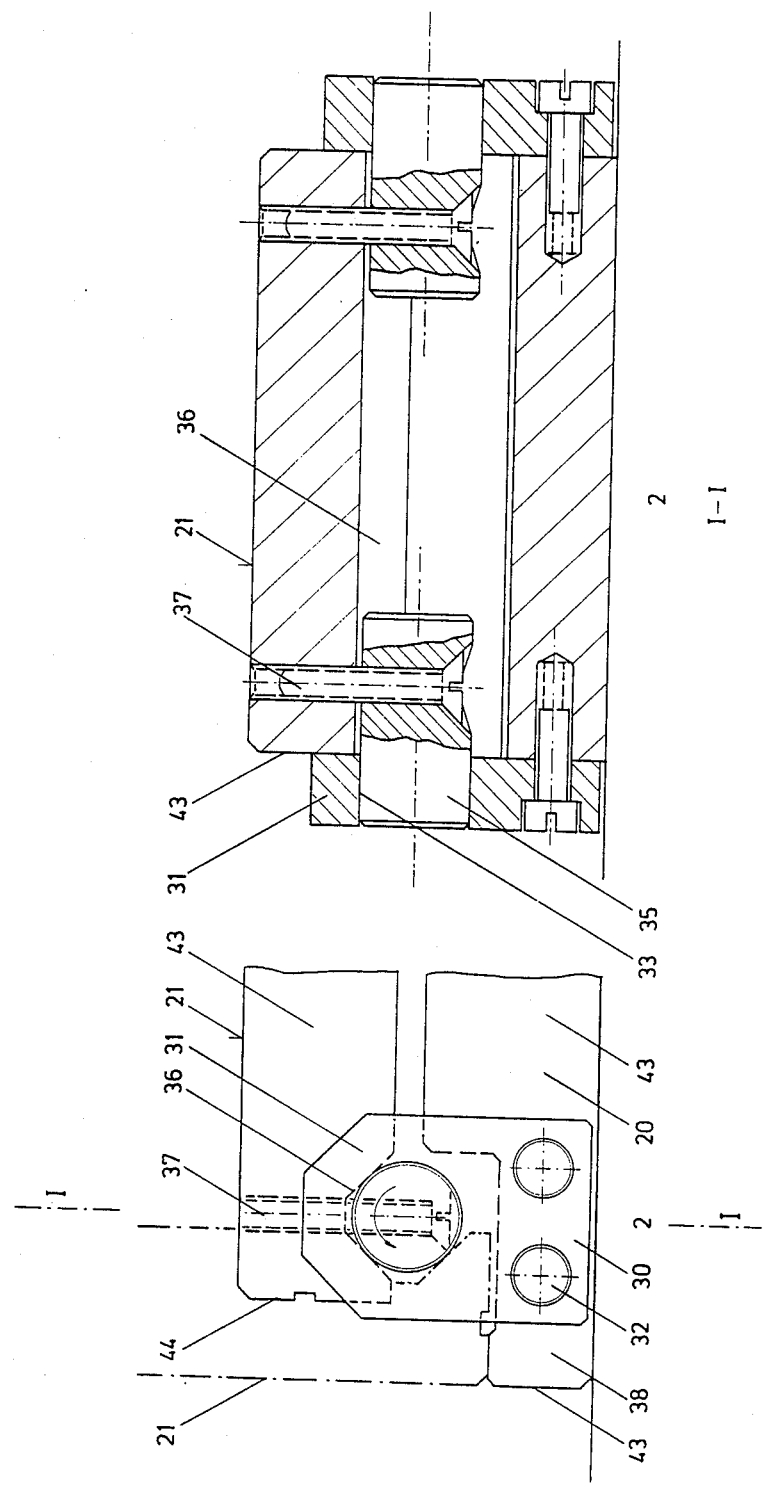

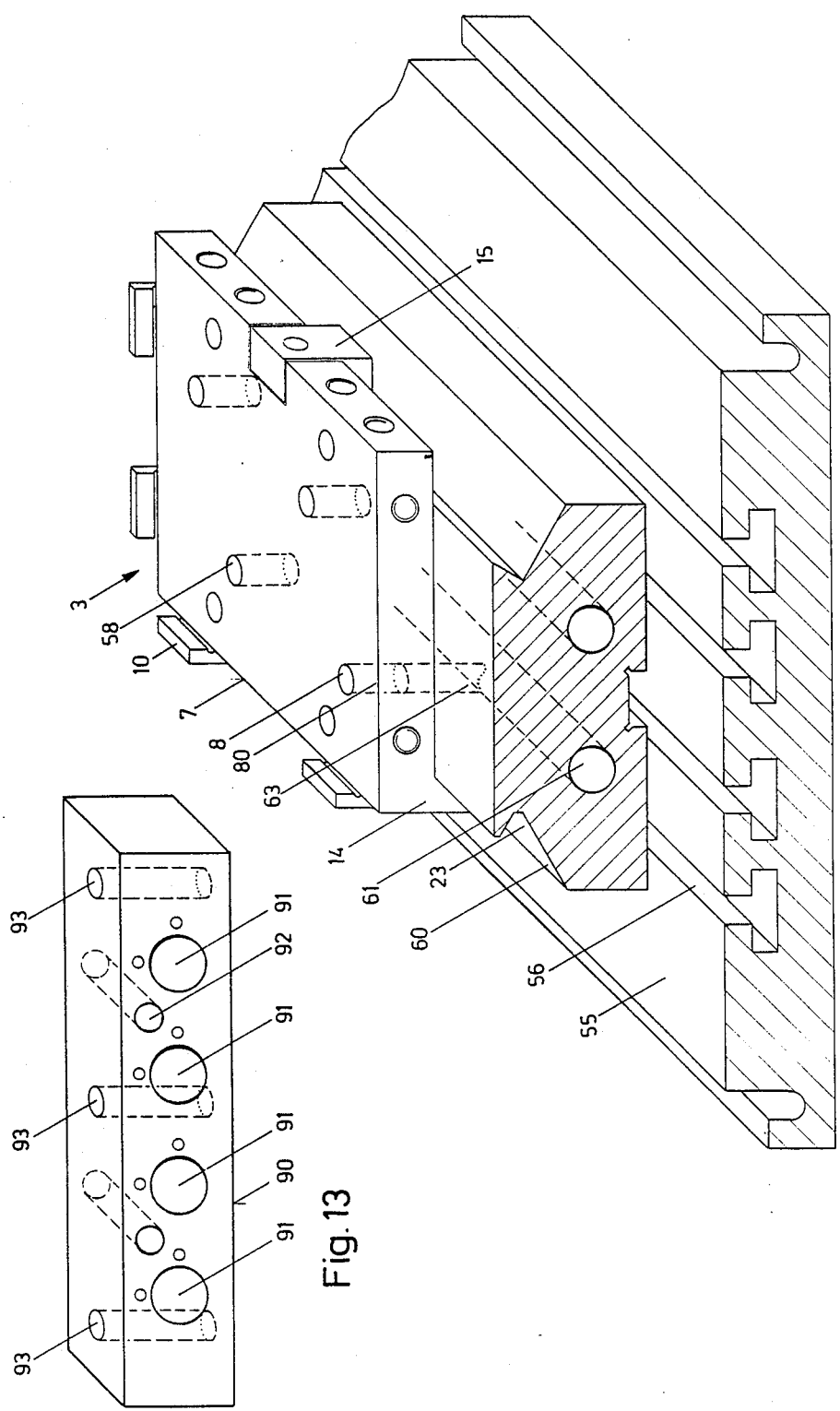

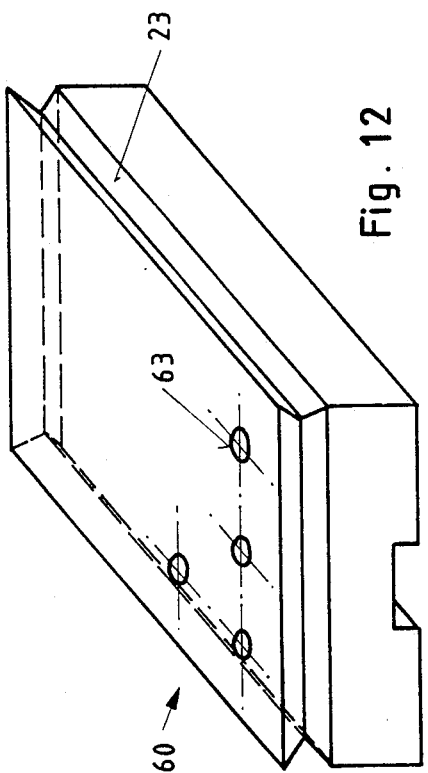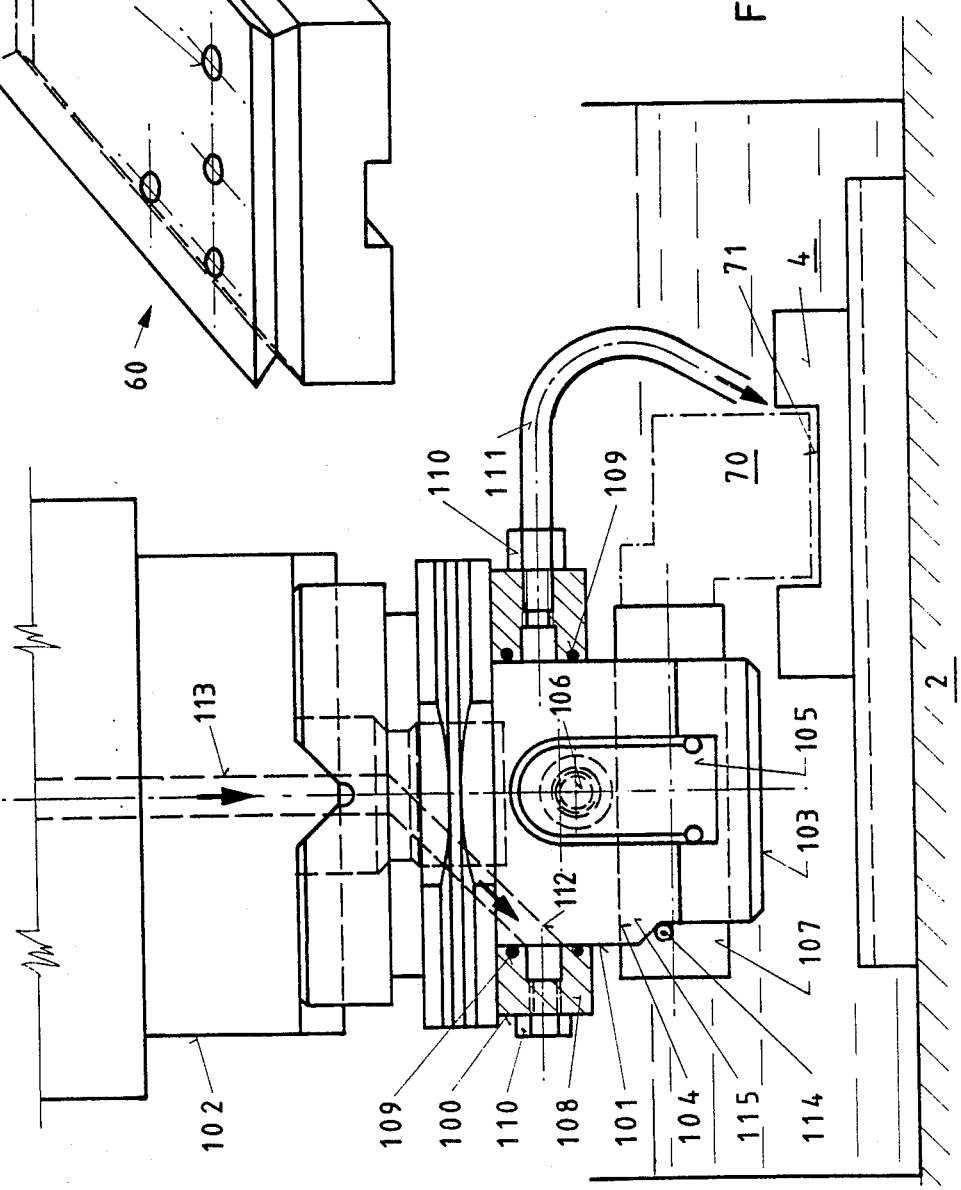

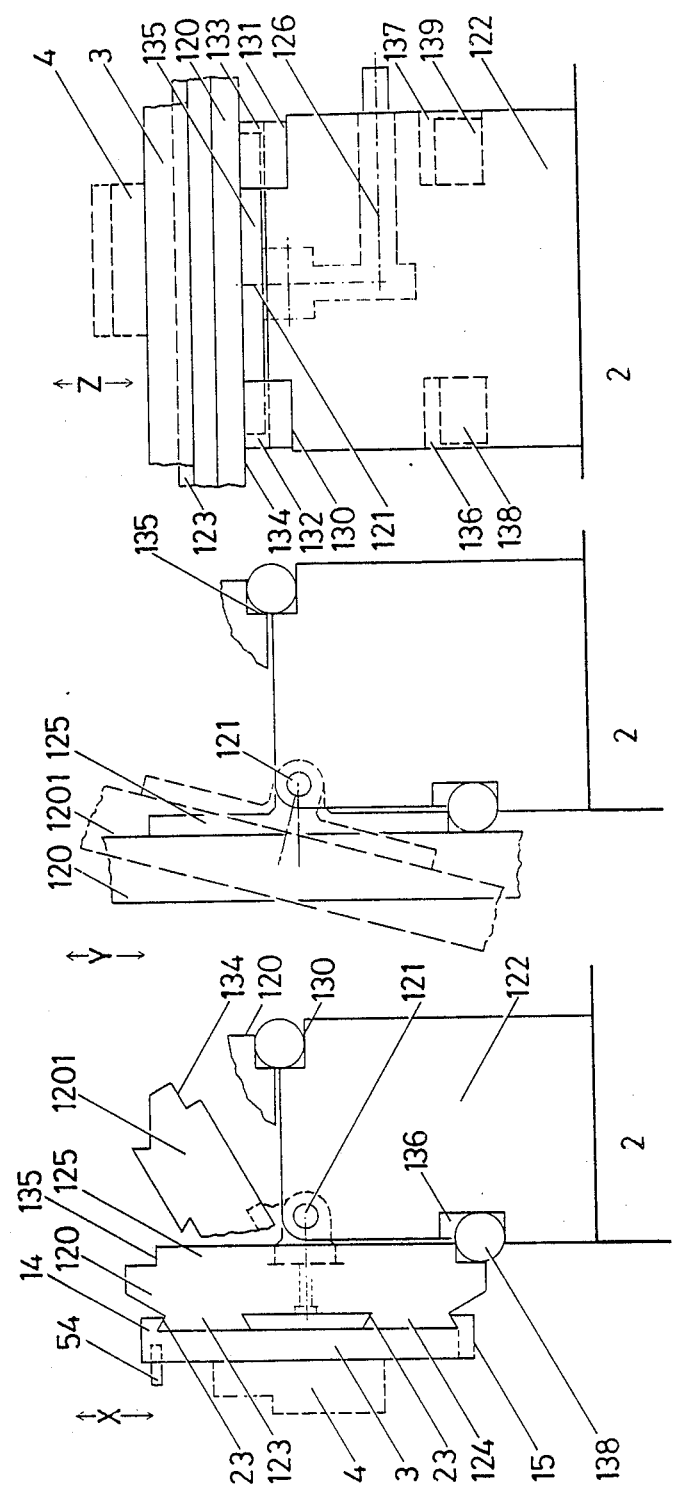

DEVICE FOR HOLDING AN OBJECT IN A SPATIAL POSITION

This application is a continuation of U.S. application Ser. No. 709,259, filed Mar. 7, 1985, now abandoned.

The present invention relates to a device for holding an object in a spatial position, having a pallet on which the object can be fixed.

BACKGROUND OF THE INVENTION

Devices are already known for holding objects, which devices have a pallet on which the object, for example a workpiece, can be fixed. The workpiece to be processed, which is located on the pallet, can be brought into the position required for processing the same at a presetting location. The workpiece, together with the pallet, and with the set position of the workpiece being held, is then fed into the working range of the machine.

In order to site the workpiece exactly in a horizontal plane, measuring devices are required which are very accurate in the two directions X and Y of the horizontal plane. Setting the workpiece in the plane is much more costly, because a cross-slide system, for example, is required for this purpose. Such horizontal measuring devices are very expensive.

OBJECTS OF THE INVENTION

An object of the present invention is to make known a holding device in which the disadvantages mentioned do not occur. Moreover, it is another object of the invention to make it possible to set the position of the object exactly in all spatial directions by a simple workholding fixture and measuring device.

GENERAL DESCRIPTION OF THE INVENTION

The present invention is directed to a device for holding an object in a spatial position, having a pallet on which the object can be fixed and a pallet-presetting structure for bringing the pallet and the object into a desired position. The individual components of the structure, the object, and surrounding parts of device can be provided with channels for conveying a fluid.

DESCRIPTION OF THE DRAWINGS

Illustrative embodiments of the present invention are described in greater detail hereinafter with reference to the attached drawings, wherein:

FIG. 5 shows a side view of a corner part of the device according to FIG. 1 which has a hinge;

FIG. 6 shows a vertical section through line I—I of FIG. 5 of that end part of the plate structure which has the hinge according to FIG. 4;

FIG. 7 shows a perspective view of the pallet of FIG. 1 which is located in the working area of a processing machine;

FIG. 12 shows a perspective view of the uppermost plate of the presetting structure, in which plate all four side surfaces are provided with grooves;

FIG. 13 shows a perspective view of a pallet that is provided with openings for receiving the shaft of several holding devices;

FIG. 14 shows an elevation of the working area of a processing machine, in which working area a further illustrative embodiment of the holder for an object is located;

FIG. 16 shows a side view of a further embodiment of the present device;

FIG. 17 shows the device of FIG. 16, in which the pallet is turned through 90°; and FIG. 18 shows a rear elevation of the device of FIG. 16.

DETAILED DESCRIPTION OF THE INVENTION

Figure 1:
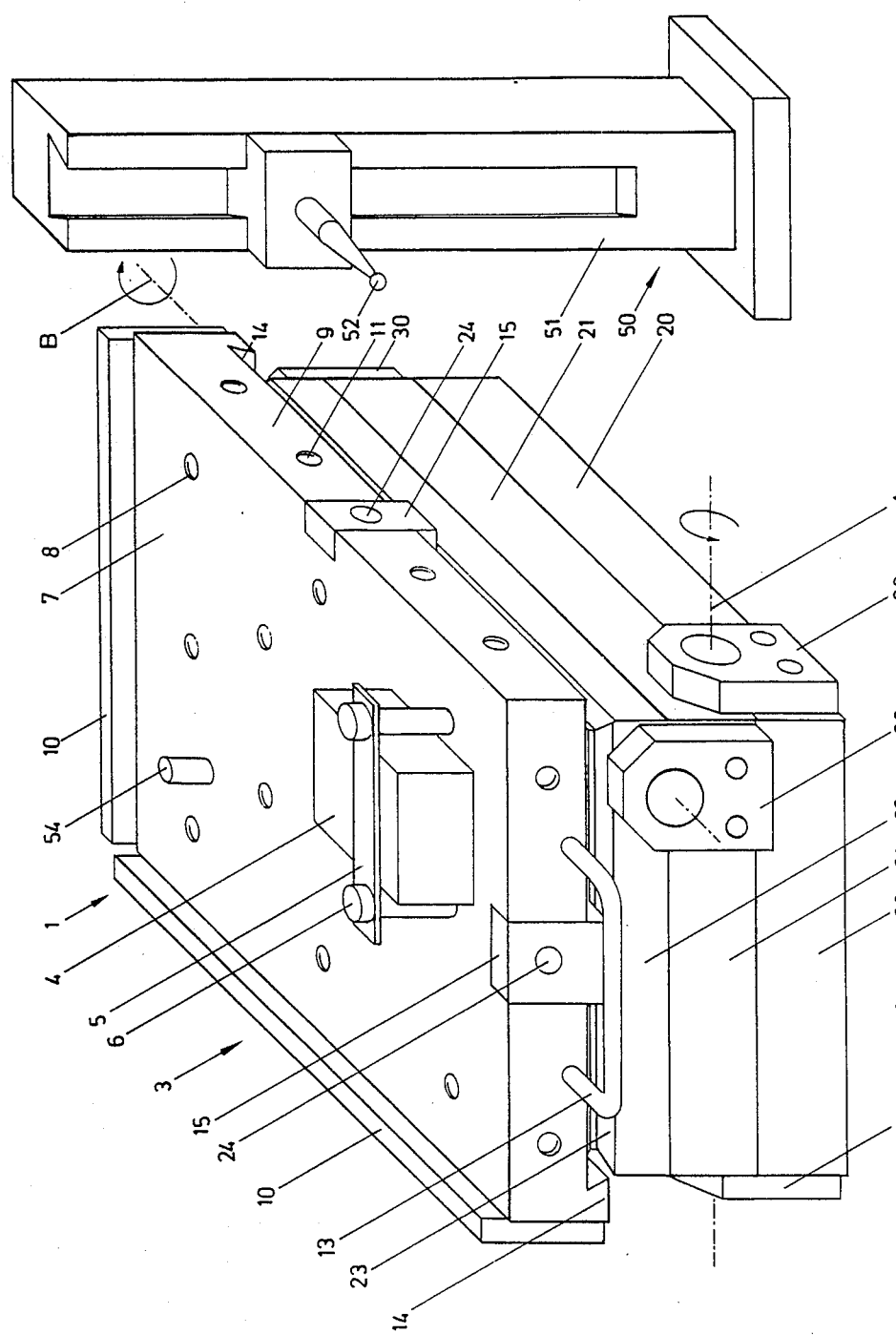
FIG. 1 shows a perspective view of the present invention which has a pallet-presetting structure with a pallet for the object.

The device for holding an object in a spatial position has a pallet-presetting structure 1 which is located at a presetting location 2 for a processing machine. This can be a machine that processes the workpiece by spark erosion, cutting, or the like.

In the presetting structure 1 is located a pallet 3 on which the workpiece 4 can be located. The workpiece 4 is only schematically shown in FIG. 1. This can be fixed, for example, by a clamping device 5 which sits on top of the workpiece and through which screws pass. Tapped holes 8 are made in the main surface of the pallet body 7, into which tapped holes 8 the screws 6 are screwed in.

Figure 2:
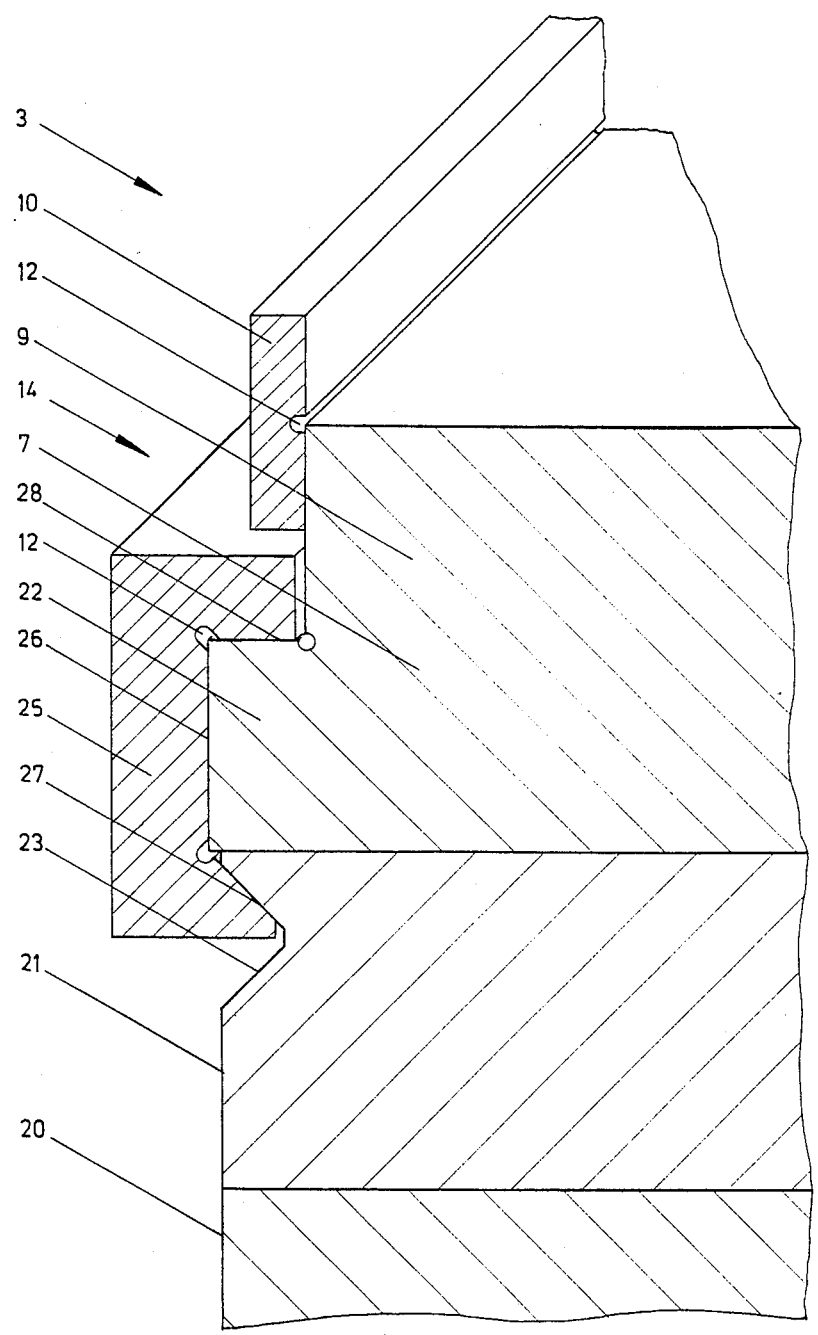
FIG. 2 shows a perspective view of a side part of the pallet-presetting structure.

Two of the side surfaces 9 of the pallet body 7 are provided with stops 10 for workpiece 4. These stops 10 are made as strips and they are fixed to the pallet body 7 by screws (not shown). These screws are screwed into tapped holes 11 which are made in the side surfaces 9 of the pallet body 7. As FIG. 2 shows, the inside of the stop strip 10 can be provided with an undercut 12 which can accommodate miscellaneous burrs on the workpiece. However, the stops 10 can also be made as short stop pieces, as is shown in FIG. 7.

Two side surfaces 9 of the pallet body 7 are provided with hand grips 13 which make it easier to handle the pallet 3. The edge parts of the pallet body 7 are provided with means 14 and 15 that enable the pallet 3 to be fixed on the plate structure 1. These means 14 and 15 will be described in greater detail hereinafter.

The presetting structure 1 contains a base plate 20 which is set up at the presetting location 2. A second plate 21 sits on the base plate, which plate 21, in the example shown, can also be designated as a center plate. A third plate 22 then sits on the second plate 21 (FIG. 1), the upper edge part of which third plate 22 is provided with grooves 23. These grooves 23 are made in the upper area of all four side walls of the uppermost plate 22.

The left-hand and rear lower edge of the pallet 3 is drawn downwards and the inside of such an elongated projection 14 is undercut. This undercut surface is in engagement with the upper side of the respective groove 23. The undercut projection 14 forms the first means for fixing the pallet 3 on the third plate 22. A shackle 15 is located opposite the respective undercut projection 14, which shackle 15 forms the second member of the fixing means for the pallet 3. There, respective shackle 15 is incorporated in a removable manner into the edge part of the pallet 3 opposite the respective projection 14. A screw 24 passes through the shackle 15, which screw 24 is screwed into the pallet body 7. The part of the shackle 15 located beneath the pallet body 7 is also undercut, so that the shackle 15 also has a part that projects inwards and can sit in one of the grooves 23 of the third plate 22. This type of connection of two objects is known, for example, from European Pat. Application No. 83,810,610.2 of the same applicant, with, moreover one or more shackles 15 being used.

So that the pallets 3 can be fixed on the plate structure 1, the pallet body 7 according to FIG. 1 must have edge parts 14 which project downwards. It would be simpler if the pallet body 7 could simply be a flat plate. FIG. 2 shows a further embodiment of the first fixing means 14 for the pallet 3, which, in order to make the pallet body 7, enables a plate to be used without the lower projection. A strip 25 is attached to the side surface of the pallet body 7, which strip 25 covers the transition area between the pallet body 7 and the upper plate 22. An elongated recess 26 is made in this strip 25, in which recess 26 the lower or left-hand side wall 27 runs inwards at an inclined angle. This inclined side wall 27 of the strip 25, fixed in the manner described to the upper plate 22, forms the undercut projecting part of the fixing means 14 which is in in engagement with the upper flank of the groove 23.

The strip 25 can be fixed to the pallet body 7 by screws (not shown). In the example shown, the upper section of the edge part of the pallet body 7 is provided with a shoulder 34, and the second side wall of the recess 26 in the connecting strip 25 is in engagement with the horizontal flank 28 of this shoulder 34. The stop strip 10 is fixed to the vertical flank 29 of the shoulder 34 by screws in the manner already described. In this way, the stop strip 10 is incorporated in the pallet 3 and the latter cannot collide with other objects. The corner parts of the shoulder 34 and the recess 26 are also provided with undercuts 12.

Figure 4:
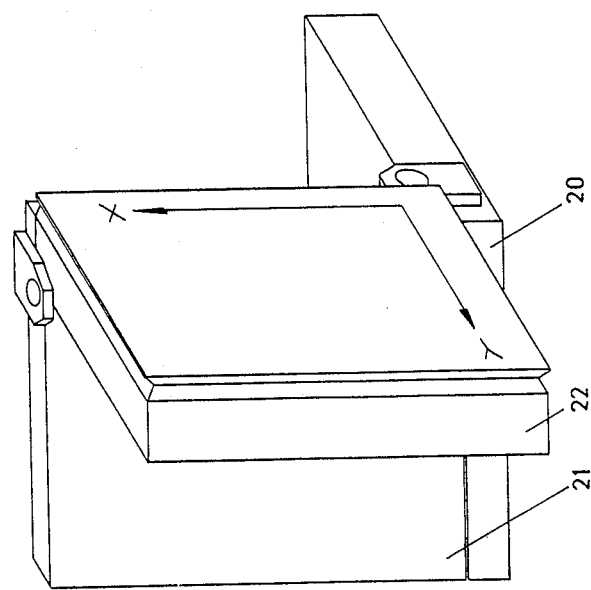
FIG. 4 shows a perspective view of the device according to FIG. 1, in which all three plates of the structure are located in an angular position relative to one another.
Figure 3:
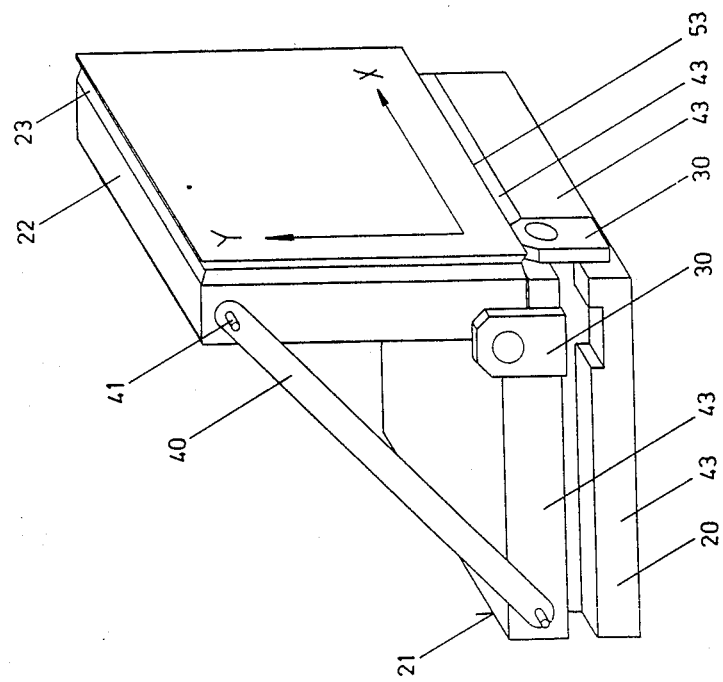
FIG. 3 shows a perspective view of the device according to FIG. 1, in which only the uppermost plate of the structure has been swung up.
Figure 8:
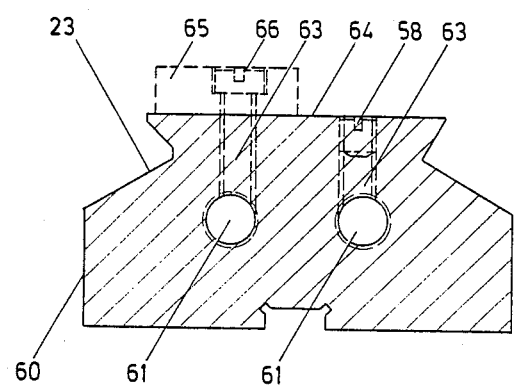
FIG. 8 shows a front view of a crosspiece, having grooves and channels, on which the pallet of FIG. 7 sits.

As shown in FIG. 1, the second plate 21 is connected to the base plate 20 and to the upper plate 22 by hinges 30. This enables these three plates 20 to 22 to be positioned relative to one another at an angle which also varies from zero. FIGS. 3 and 4 show such positions of the plates 20 to 22. According to FIG. 3, the second plate 21 sits on the base plate 20, whereas the third plate 22 is positioned at an angle alpha of about 90 degrees relative to the second plate 21. So that the swung-out plate 22 cannot swing back, a connecting bracket 40 or another clamping device is provided The end parts of the connecting bracket 40 are each provided with a pin 41 which can be inserted into corresponding holes in the side walls 43 of the plates 21 and 22. The distance of these holes from the swivel access of the hinges 30 is selected in such a way that, at a given distance of the pins 41 and 42 of the connecting bracket 40 from one another, the plates 21 and 22 enclose the required angle alpha, for example 90 degrees.

FIG. 1 also shows a vertical measuring column 50 which is set up at presetting location 2. This column can be a commercially available measuring column that is set up on the worktable of a processing machine or at a presetting location and which is used for exactly setting the distance between the worktable and a certain point on a workpiece, tool, etc. Such vertical measuring columns are relatively convenient to procure. They can be moved easily on the worktable. The measuring column has a measuring probe 52 which projects laterally from the measuring column body 51 and the height of which can be set, as desired. This measuring column is provided with a cylindrical pin 54 at a suitable location, such as, for example, in one of the corners of the pallet 3. The circumferential surface of this pin 54 is used as the reference surface for the measuring probe 52 at the presetting location and for the tool in the processing machine.

For the sake of simplicity, the pallet 3 in FIGS. 3 and 4 has been omitted, the fixing means 14 and 15 of which are in engagement with the grooves 23 in the upper plate 22 and thus hold the pallet 3 in the same inclined position as the upper plate. Therefore, what is stated hereinafter with reference to the upper plate 22 also applies to the pallet 3. Axes X and Y, which are positioned at right angles to one another, are shown on the upper main surface of the upper plate 22. These axes X and Y indicate the two main directions in a horizontal plane, and with reference to these axes, the coordinates of the individual points of a workpiece in a horizontal plane are read off and determined. When the upper plate 22 is located in the swung-up position, as shown in FIG. 3, the axis X continues to lie in a horizontal position. On the other hand, the axis Y runs vertically. If it is desired to bring a point of the workpiece 4 to a very definite position in the Y direction, this distance is set between the measuring probe 52 and table of the presetting location 2, making due allowance for the distance of the lower edge 53 of the plate 22 or the pallet 3 from the presetting location 2. The measuring probe 52 is then brought near to the workpiece 4 and the latter is moved in the Y direction until the desired point of the workpiece is located at the top of the measuring probe. The workpiece is fixed in this position.

So that the position of the workpiece 4 can also be set in the second direction X of a horizontal plane by the vertical measuring column 50, the combination consisting of the upper plate 22 in the swung-up position and the center plate 21 is swung towards the left, as shown in FIG. 4. The coordinate system X-X is also shown on the main surface of the upper plate 22. It can be seen from this that, after the plate combination 21 and 22 is swung over, the X axis now runs vertically. The position of a certain point of the workpiece 4 can therefore now be set also in the X direction in the previously described manner by the vertical measuring column 50. The two plates 21 and 22 can now be swung back. The pallet 3 with the workpiece 4 is removed from the upper plate 22 by releasing the fixing means 14 and 15 and brought into the working area of a processing machine.

Of course the vertical position of a point of the workpiece 4 can also be set by the measuring column 50 if the workpiece 4 is located in its horizontal position, that is, if the axes X and Y are located in a horizontal plane.

FIG. 1 shows that the base plate 20 is connected to the center plate 21 by a first pair of hinges 30, with this pair of hinges having an axis A. The upper plate 22 is connected to the center plate 21 by a further pair of hinges 30, with the axis B of this hinge pair being at right angles to the axis A of the first mentioned hinge pair. Such a connection of the plates 20 to 22 to one another enables these plates to be positioned relative to one another as shown in FIG. 4.

FIGS. 5 and 6 show a corner part of the pallet-presetting structure 1 in which one of the hinges is located. The hinge 30 contains a hinge plate 31 which is fixed to one of the side walls 43 of the base plate 20 by screws 32. A hole 33 is made in the upper area of the hinge plate 31, in which hole 33 the end part of a pin 35 is located. A cut-out 36, which in cross section has a roof shape, is made in the lower side of the adjacent edge part of the second plate 21, in which cut-out 36 the remaining part of the respective pin 35 sits. This part of the pins 35 sits on the straight-running legs of this cut-out 36, and the pins 35 are held in situ by screws 37 which are screwed into the second plate 21. The remaining hinges 30 in FIG. 1 are made in the same way, so that each plate has two pins 35 that project from the side surfaces of the plate and are aligned with one another. These pins 35 form the first half of the hinge 30. The plate coupled to such a plate has hinge plates 31 which are fixed to the opposite side surfaces of this plate and which form the second half of the hinge 30.

FIG. 5 shows that the respective hinge plate 31 is located at a distance from that side surface 43 of the base plate 20 which runs parallel to the axis A of the hinge pair attached here. The edge part 38 of the plate 20 that projects beyond the hinge plates 31 forms a stop on which the side surface 44 of the plate 21 located above it rests when this plate 21 is located in its swung-up position (shown as a chain-dotted line).

FIG. 7 shows a machine table 55 with T grooves 56, on which machine table 55 a base body 60 is fixed in a known manner. This base body 60 has an elongated design and its upper edge part has the previously described grooves 23. The pallet 3 is located on this grooved body 60, which pallet 3 has been described in connection with FIG. 1 and which is held on the grooved body by the fixing means 14 and 15. The holes 8, which have already been discussed in connection with FIG. 1, are made as through holes, so that they form channels 80 which extend between the two main surfaces of the pallet body 7.

Figure 9:
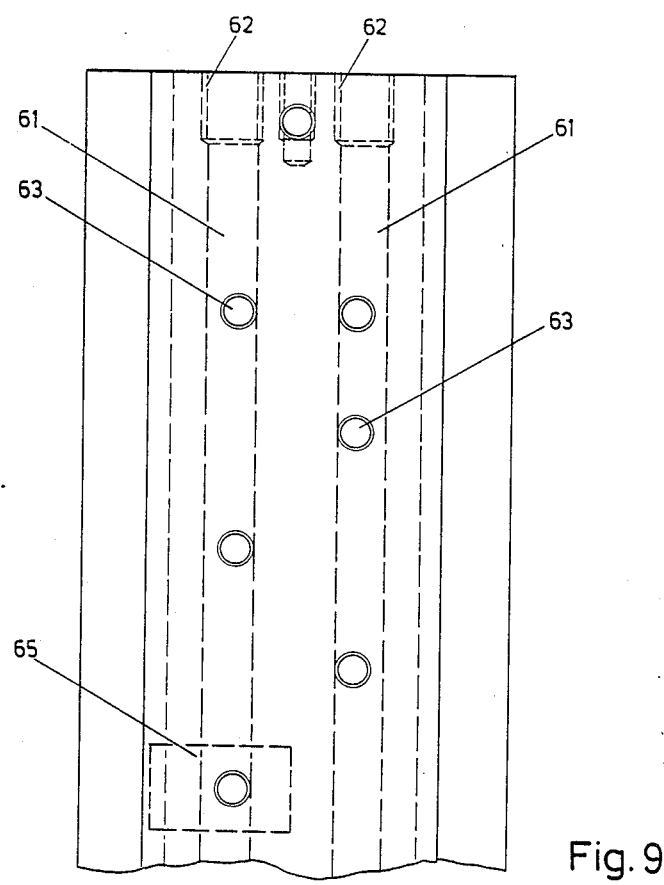
FIG. 9 shows a plan view of the crosspiece of FIG. 8.

Main channels 61 which run in a longitudinal direction of the grooved body 60 are made in the latter, which main channels 61 open into the end surfaces of the grooved body 60. As is shown in FIG. 9, one of the end parts of these main channels 61 is provided with a screw thread 62, so that here, for example, hoses (not shown) can be connected for supplying cooling or rinsing fluid. Distribution channels 63 adjoin the main channels 61, which distribution channels 63 run at an angle, for example 90 degrees, relative to the main channels 61. These distribution channels 63 are connected flow-like at one end to the main channels 61 and, at the other end, they open into the upper side 64 of the grooved body 60.

The pallet channels 80 are made at such locations of the pallet 3 that they can be brought into alignment with the distribution channels 63 in the grooved body 60 simply by displacing the pallet 3 along the latter. This enables the fluid to be supplied through the pallet 3 up to the workpiece or tool, with it then being possible for the fluid to be conveyed from the upper mouth of the pallet channels 80 through further hoses of suitable cross section and requisite number up to the work location. This is therefore of great economic importance, because the supply hoses, etc., can already be attached to the pallet at the presetting location; previously, in fact, the supply hoses could only be changed in the working area of the machine, which led to undesirable machine downtime. The mouths 8 of the pallet channels 80 through which no fluid is to be conveyed and which nevertheless are located above one of the distribution channels are sealed with plugs 58.

In order to bring the channels 63 and 80 into coincidence as easily and quickly as possible, a stop 65 can be attached at a suitable location of the grooved body 60, which stop 65 is held in situ by a screw 66 which is screwed into one of the distribution channels 63.

Figure 11:
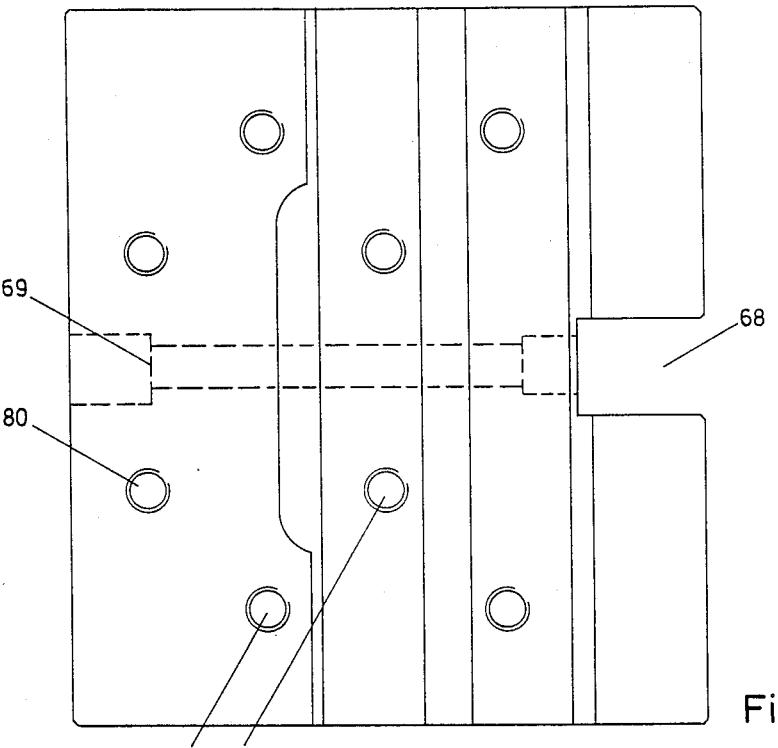
FIG. 11 elevation of the pallet of FIG. 10.
Figure 10:
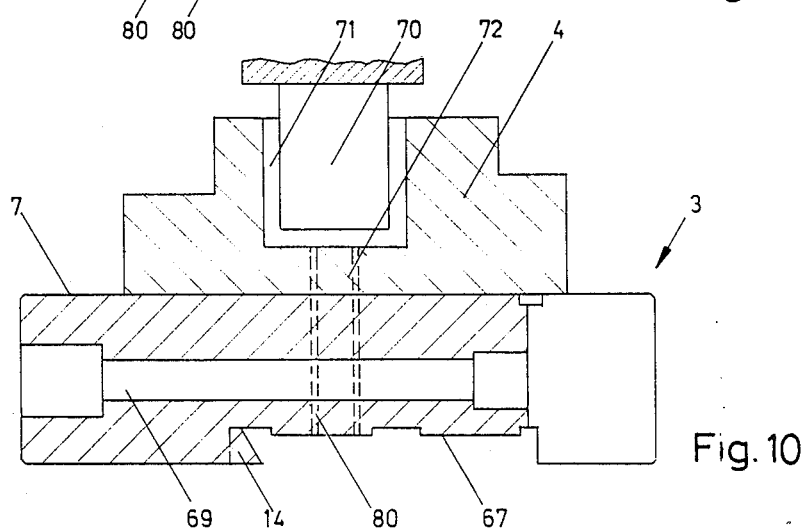
FIG. 10 shows a cross section of a further embodiment of the pallet of FIG. 1.

FIGS. 10 and 11 show a relatively small pallet 3 on which the workpiece 4 is fixed. The underside of the pallet 3 is made with a spline 67, in which one side wall of the same is undercut in such a way that it represents the first fixing means 14 for the pallet 3. The shackle 15, which represents the second fixing means, is normally arranged in that cut-out 68 of the pallet body 7 which is designated 68 in FIG. 11. The screw 24 which holds the shackle 15 in this cut-out 68 is screwed into a transverse hole 69 which is made in the pallet body 7. The pallet 3 has several through-channels 80 which, as has already been described, can be brought into coincidence with the distribution channels 63.

A recess is shown at about the center of the workpiece 4, in which recess the tool 70, for example of a spark erosion machine, is located. Such a process takes place under the supply of a rinsing fluid. To be able to supply this into the gap 71 between the workpiece 4 and the tool 70, a through-hole 72 is provided in the bottom of the workpiece, the axis of which hole 72 coincides with the axis of the pallet channel 80. The fluid can then be fed directly and simply into the process zone through the pallet channel 80 and the hole 72.

FIG. 12 shows a base body 60 that is plate-shaped. Otherwise, this base body 60 is also provided with the grooves 23 and the channels, of which only the mouths of some of the distribution channels 63 are shown here. According to FIG. 13, a base body 90 is provided with several holes 91 located next to one another. The shaft of a holder for an object can be inserted in each of these holes 91. Several objects can be held simultaneously in the process zone of a machine by such a base body 90. The base body 90 is provided with further holes 92 and 93 through which fixing screws for the base body 90 can pass.

The gap 71 between the workpiece 4 and the tool 70 can be supplied by a rinsing device 100 which is attached to the tool holder 101 (FIG. 14). The tool holder 101 is interchangeably fixed to the head 102 of a processing machine. The tool holder contains a block 103 which is connected to the machine head 102. A horizontally running hole 104 is made predominately in the lower part of this block 103, which hole 104 extends over the entire width of the block 103. A tongue 105 is cut out in the front wall of the block 103, which tongue extends over almost the entire height of the block 103. A screw 106 which is screwed into the material of the block 103 passes through the top of this tongue 105, which is located in the upper half of the block 103. A shaft 107 is located in the hole 104, on which shaft 107 the tool 70 is fixed. When the screw 106 is tightened, the shaft 107 is firmly clamped in the hole 104 and the tool is consequently fixed in a desired position. A stop pin 114 which sits on a corresponding projection 115 on the block 103 is used for quickly and accurately setting the position of the shaft 107 in the block 103.

A hollow ring 108 which has a C-shaped cross section in the example shown is attached to the upper half of the block 103. The open side of this ring 108 sits tightly on the outside of the block 103. For this purpose, sealing rings 109 are located between the ring 108 and the block 103. Connecting nipples 110 for hoses 111 are attached on the outside of the ring 108. A channel 112 is made inside the block 103, which channel 112 opens, on the one hand, into the inside of the ring 108 and, on the other hand, into the connecting location of the tool holder 101 at the machine head 102. A further channel 113 is made in the machine head 102, through which channel 113 the fluid which is required for processing the workpiece is supplied.

The fluid flows from the supply channel 113 through the connecting channel 112 into the inside of the ring 108. Here, the fluid is distributed along the entire periphery of the block 103. The connecting nipples 10 are normally closed. But, when it is necessary, the hose 111 is connected to the corresponding nipple and the fluid can be conveyed out of the ring here and fed to the desired location of the workpiece 4.

Figure 15:
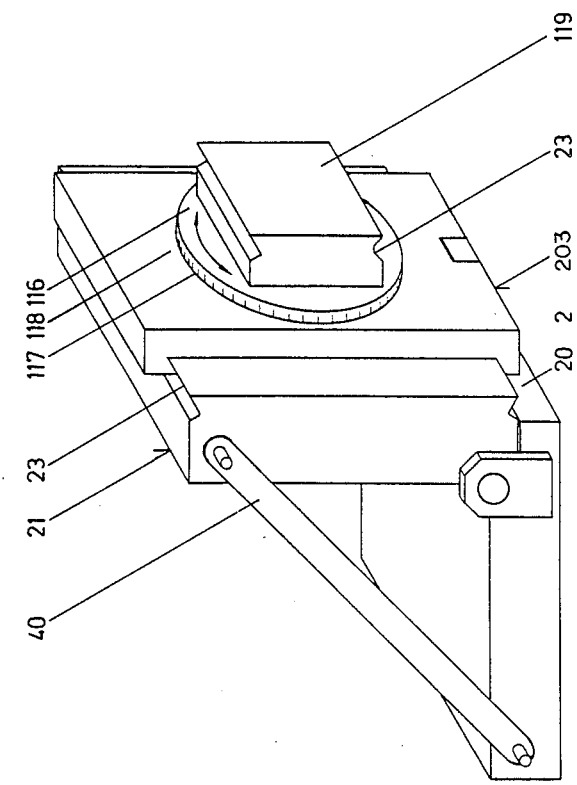
FIG. 15 shows a perspective view of a further embodiment of the present device.

FIG. 15 shows a further embodiment of the present device. This device contains the base plate 20 already discussed here and the plate 21 which is hinged onto the latter and, in the example shown, is located in its vertical position. This second plate 21 is provided with the grooves 23 already discussed, so that a pallet 20 can be fixed on this plate 21. A turntable 116 is rotatably mounted on the pallet 3, with the peripheral part of this turntable 116 being provided with a calibrated scale 117 to which one or more marks 118 on the pallet 3 are allocated—a dividing head. The workpiece can be fixed on the turntable 116 in a known manner. However, a further plate 119 can also be fixed on the turntable 116, the side faces of which plate 119 are provided with grooves 23 which have already been discussed here. To hold the workpiece, a pallet can be used which is equipped with the means, also already discussed here, for engaging in the grooves 23.

When the second plate is located in the swung-up position and when a workpiece is fixed on the turntable 116, the workpiece can be brought in succession into positions by turning the turntable 116, which positions are displaced, for example by 90 degrees, relative to one another. In these positions, the workpiece can be measured or set in the directions X and Y. In this connection, a certain angular position of the workpiece, which is different from the horizontal or vertical position, can be measured and set.

FIGS. 16 and 18 show a further embodiment of the present device. In this case, the pallet-presetting, structure 1 has a plate 120 which is connected to a base 122 by a swivel link 121, with this base 122 being set up on the presetting location 2. The swivel link 121 can be of a generally known type and is therefore not described in greater detail here.

The plate 120 has an elongated design, as shown, especially by FIGS. 17 and 18. The upper side of the plate 120 has two elongated projections 123 and 124 which run parallel to one another, the side walls of which are provided with grooves 23 which have already been described. At least one pallet 3 can be set up on each of the projections 123 and 124 designed in this way. In the example shown, however, only a single pallet 3 sits on the plate 120, but the pallet 3 is so wide that it extends over the two projections 123 and 124. The edge parts of this pallet 3 are provided with the gripping elements 14 and 15 already described (FIG. 16) which are in engagement with the outer grooves 23 in the projections 123 and 124 of the plate 120. The workpiece 4 is fixed in a known manner on the upper side of the pallet 3. A cylindrical pin 54 projects from the pallet 3, which pin 54 indicates the starting point for the processing of the respective workpiece 4.

An extension 125, the base surface of which is quadratic, projects from the underside of the plate 120. Several quadratic extensions 125 can adjoin the elongated plate 120 along the latter, so that various locations of the, base body 120 can be coupled to the base 122. The base 122 is shaped as a rectangular solid which is arranged on the presetting location 2 or 55, in an upright position in the example shown. One of the edge parts of this rectangular solid 122 is provided with the swivel link 121 already mentioned. This swivel link 121 is provided with a locking device 126 which, as it is known, is only shown schematically in the drawing (FIG. 18). The other end part of the link 121 is fixed to the base body 120 at the center of the extension 125. The plate 120 may not only be swivelled about the link 121 but also rotated as shown especially by FIG. 17, where the plate is shown only schematically. The plate 120 can, on the one hand, assume a vertical position and, on the other hand, a horizontal position, as shown in FIG. 16. The plate 120 can also assume intermediary located positions, in which it is designated 1201 and in which it can be rotated about the link 121.

The upper side of the rectangular solid 122 is provided with cut-outs 130 and 131 which are located at a distance from one another and in which rigid bodies 132 and 133 having a cylindrical surface are located. These bodies 132 and 133 are held in the cut-outs 130 and 131 by screws (not shown) and they act as supports for the plate 120. These support bodies 132 and 133 only form line contact with the underside 134 of the plate 120. The distance of the support bodies 132 and 133 from the center of the swivel link 121 is selected in such a way that the side wall 135 of the extension or prolongation 125 also forms line contact with the rollers 132 and 133. That side wall of the rectangular solid 122 which is closest to the swivel link 121 is provided with recesses 136 and 137 in which further support bodies 138 and 139 are located. These project out of the recesses 136 and 137. The distance of these support bodies 138 and 139 from the center of the swivel link 121 is selected in such a way that the side wall 135 of the extension or prolongation 125 forms line contact with the rollers 138 and 139.

The position of the extension 125, and thus also of the entire plate 120, is clearly and exactly defined in the respective end position of the latter by the pair of support bodies 132 and 133 or 138 and 139. The swivel link 121 can also be locked. The position of the workpiece 4 on the pallet 3 can now be exactly set relative to the pin 54 in one direction, for example in the X direction, and in fact simply by displacing the latter in the vertical, direction. The swivel link 121 is then unlocked and the plate 120 is swivelled (FIG. 17) in such a way that the extension 125 disengages from the deeper located support bodies 138 and 139. The plate 1201 can now be turned through 90 degrees about the link 121, after which the extension 125 is again brought into engagement with the lower rollers 138 and 139. Now the workpiece 4 is also turned through 90 degrees and the position of the workpiece 4 can be exactly set in the Y direction simply by means of displacement in the vertical direction. The plate 120, together with the pallet 3 and the workpiece 4, is then swivelled in such a way that they are located in a horizontal position, as shown in FIG. 18. The position of the workpiece 4, if necessary, can now be set in the Z direction and in fact also by simply displacing the workpiece in the vertical direction.

What is claimed is:

1. An apparatus for setting an object in a desired position in a horizontal plane, comprising:
   (A) a base having a surface in the horizontal plane;
   (B) a first member pivotably connected to the base so that the first member can be pivoted between either a position parallel to the surface of the base or a position perpendicular to the surface of the base about an axis A;
   (C) a pallet coupled to the first member, the pallet being capable of bearing an object thereon and being pivotable with the first member between either the position parallel to the surface of the base or the position perpendicular to the surface of the base;
   (D) a measuring column which is placed adjacent to the base and which has a measuring probe located at a predetermined vertical distance above a surface upon which the base and the column are placed;
   wherein the desired position of the object along a directional perpendicular to the axis A is set by pivoting the first member to the position perpendicular to the surface of the base and positioning the object with respect to the measuring probe; and
   (E) a second member which is pivotably connected to the first member about an axis B so that the second member can be pivoted between a position parallel to the surface of the base and a position perpendicular thereto, wherein the axis A is at right angles to the axis B, and the pallet is slidably attached to the second member and pivotable with said second member between the position parallel to the surface of the base and the position perpendicular to the surface of the base, and wherein the desired position of the object along a direction perpendicular to the axis B is set by pivoting the second member to the position perpendicular to the surface of the base and positioning the object with respect to the measuring probe;
   wherein the pallet is provided with a cylindrical pin mounted thereon, the circumferential surface of which is used as a reference surface for the measuring probe.

2. An apparatus as claimed in claim 1, wherein the second member is provided with grooves in outer edge regions of at least two opposing sides thereof, and the pallet is provided with gripping means for removably connecting the pallet to the second member.

3. An apparatus as claimed in claim 1, wherein one of said members is provided with pins aligned with each other and projecting from two opposite side surfaces of said one of said members, representing one half of a hinge, and the other of said members is provided with hinge plates affixed to the side surfaces thereof, and wherein the projecting parts of the pins are located in holes of the hinge plate.

4. An apparatus as claimed in claim 2, wherein the pallet has a rectangular shape, and is provided with two pairs of gripping means, wherein each pair of gripping means is associated with a pair of opposing marginal portions of the pallet body.

5. An apparatus as claimed in claim 4, wherein the first pair of gripping means comprises a downward projection extending from at least one lower edge of the pallet, and the inside of the elongated projection is undercut.

6. An apparatus as claimed in claim 4, wherein the first pair of gripping means comprises a strip attached to the side surface of the pallet, said strip having an inwardly pointing projection located below the lower surface of the pallet which engages one of the grooves of said second member.

7. An apparatus as claimed in claim 4, wherein the second pair of gripping means comprises a shackle placed in a recess in a side of the pallet and a screw which passes through the shackle and engages the side of the pallet, wherein said shackle has an inwardly pointing projection located below the lower surface of the pallet which engages one of the grooves of said second member.

8. An apparatus for setting an object in a desired position in a horizontal plane, comprising:
   (A) a base having a surface in the horizontal plane;
   (B) a first member pivotably connected to the base so that the first member can be pivoted between either a position parallel to the surface of the base or a position perpendicular to the surface of the base about an axis A;
   (C) a pallet coupled to the first member, the pallet being capable of bearing an object thereon and being pivotable with the first member between either the position parallel to the surface of the base or the position perpendicular to the surface
   (D) a measuring column which is placed adjacent to the base and which has a measuring probe located at a predetermined vertical distance above a surface upon which the base and the column are placed;
   (E) a second member which is pivotably connected to the first member about an axis B so that the second member can be pivoted between a position parallel to the surface of the base and a position perpendicular thereto, wherein the axis A is at right angles to the axis B, and the pallet is slidably attached to the second member and pivotable with said second member between the position parallel to the surface of the base and the position perpendicular to the surface of the base, and wherein the desired position of the object along a direction perpendicular to the axis B is set by pivoting the second member to the position perpendicular to the surface of the base and positioning the object with respect to the measuring probe;
   wherein one of the members is provided with pins aligned with each other and projecting from two opposite side surface of the one of the members, representing one half of a hinge, and the other of the members is provided with hinge plates affixed to the side surfaces of the other of the members, and wherein the projecting parts of the pins are located in holes of the hinge plate; and
   wherein the hinge plates are located at a distance from the side surface of the other of the members which runs parallel to the hinge axis B, so that the edge part of the plate of the members forms a stop for the one of the members.

* * * * *